Aug. 10, 1926.
W. B. RAYTON
1,595,417
LENS GAUGE
Filed June 14, 1922
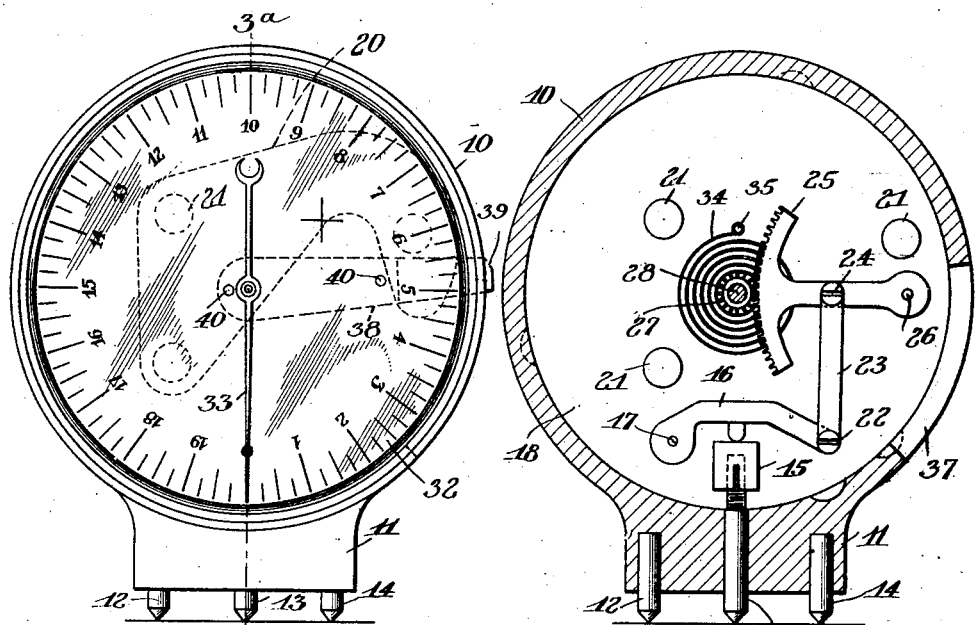
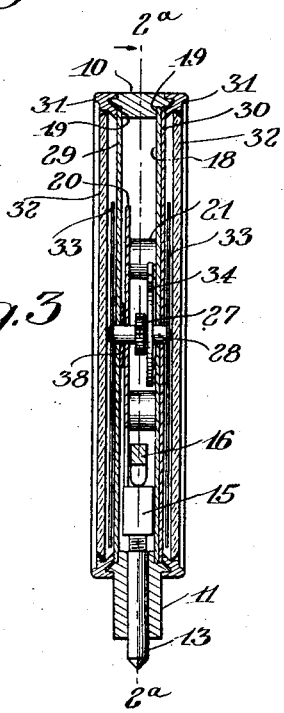
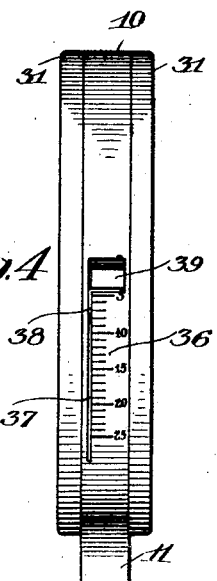
INVENTOR.
Wilbur B. Rayton
BY
his ATTORNEY Patented Aug. 10, 1926.

1,595,417

UNITED STATES PATENT OFFICE.

WILBUR B. RAYTON, OF ROCHESTER, NEW YORK, ASSIGNOR TO BAUSCH & LOMB OPTICAL COMPANY, OF ROCHESTER, NEW YORK, A CORPORATION OF NEW YORK.

LENS GAUGE.

Application filed June 14, 1922. Serial No. 568,206.

This invention relates to measuring instruments and more particularly to instruments or gauges for measuring lenses having as one of its objects the provision of an instrument of this character for measuring a lens in which results, corresponding to two or more different measurements of the lens, as for example, measurements of both its curvature and thickness, may be automatically and quickly combined by the operation of the instrument and indicated thereby as a single result, thus eliminating the written computation of such result with its attendant likelihood of error. More specifically stated, it is an object of the present invention to provide a gauge for measuring the curvature of a lens surface and indicating the power thereof, having an additional indicating means adapted to be set selectively in accordance with one of a series of values corresponding to the thickness of the lens, with a connection between the two indicating means for adjusting one of the latter by the setting of the other to indicate directly the sum of the two measurements. To these and other ends the invention resides in certain improvements and combinations of parts all as will hereinafter be more fully described, the novel features being pointed out in the claims at the end of the specification.

In the drawings:

Figure 1 is a face view of a measuring instrument or curvature gauge having the invention applied thereto;

Figure 2 is a sectional view of the same on the line 2ª—2ª of Figure 3;

Figure 3 is a sectional view on the line 3ª—3ª of Figure 1, and

Figure 4 is a side or edge view of the device as seen from the right in Figure 1.

Similar reference numerals throughout the several views indicate the same parts.

The vertex refraction or reciprocal of the back focus of a lens is determined from measurements including that of the curvature of the surfaces and the measurement of the lens thickness. As the computation of the vertex refraction from such measurements is of a more or less tedious nature it is desirable to provide apparatus for simplifying and expediting such computations from the measurements referred to above, and the present invention accordingly provides an instrument for measuring the curvature of the lens surfaces and indicating the power thereof and at the same time a device in combination therewith adapted to be set with reference to values corresponding to the thickness of the lens and connected with the said indicating means to adjust the latter to indicate in a single reading a desired computation based on both such measurements, thus eliminating a written computation and the opportunity for error therein as well as the time consumed thereby.

Referring more particularly to the drawings, there is shown a curvature gauge comprising an annular or ring-shaped frame member 10 having an enlarged base portion 11 in which are carried a plurality of contacts 12, 13 and 14. As is common in such instruments, these contacts are arranged in a line, the outer contacts being fixed in the frame abutment while the intermediate contact 13 is movable relatively to the other contacts, being slidably carried in a bore in the frame. As well understood in the art, when the gauge contacts are applied to a curved surface, the intermediate contact 13 moves inwardly or outwardly in connection with an indicating mechanism hereafter described. The intermediate contact 13 extends within the annular frame 10, Figure 2, and is threaded at this end for adjustably supporting a nut 15 to adjust or vary the effective length of the contact. The contact nut 15 is engaged by a lever arm 16 pivoted at 17 between a disk shaped frame plate 18 supported on a shoulder 19 of the annular frame member 10, and a second frame plate 20, as best shown in Figure 3. Plate 20 is angularly shaped and supported in spaced relation with the frame plate 18 by means of posts 21 to form a frame for supporting the operating and indicating mechanism.

Lever arm 16 is pivotally supported as stated between the frame plate 18 and 20 and is pivotally connected at its outer end 22, Figure 2, to a link 23 pivotally connected at its other end 24 with a toothed sector 25 pivoted between the frame plates at 26. The tooth portion of the sector meshes with a pinion 27 fixed on a spindle 28 journaled at its ends in the frame plates 18 and 20. The opposite ends of spindle 28 extend beyond the frame plates through openings in a pair of dial plates 29 and 30 visible respectively from opposite sides of the instrument. These dials and the frame plate 18 are supported in the shoulders 19 of the frame member 10 by means of bezels 31 carrying crystals 32. The ends of spindle 28 between the crystals and dial are each provided with an index or pointer 33 and it is apparent from the above description of the mechanism that as the contact 13 moves inwardly or outwardly of the frame to conform with a curved surface, its inner end oscillates arm 16 and by the means described swings the sector 25 and rotates spindle 28 and the pointers carried thereby. A spring 34 fixed to the spindle 28 and to frame plate 18 as at 35, tends to move the contact 13 outwardly, the parts being so adjusted and arranged that when the three contacts are in line the index 33 normally stands at zero. The dial on one side of the instrument shown in Figure 1 is marked with a plus sign and is intended for use with positive or convex curvatures while the dial which is visible on the opposite side of the instrument is graduated in an opposite sense for use with negative or concave curvatures. As the present invention has to do more particularly with the positive readings for the instrument, the negative indications do not require further explanation. The dials are graduated as shown to indicate the power of a lens surface in dioptrics.

While the invention is, in the present instance, embodied in conjunction with a gauge of the above description, the latter may, if desired, have the form well known in the art in which instead of two separate dials, one on each side of the instrument, a single dial may be employed on which the positive and negative readings extend in opposite directions from zero, the index or pointer moving in the one direction or the other from zero depending upon whether the curvature measured is positive or negative.

The vertex refraction of a lens may be computed from the formula $D = D^1 + D^2 + A$ in which D represents the vertex refraction of the lens to be ascertained, $D^1$ the power in dioptrics of the first surface of the lens, $D^2$ the power in dioptrics of the second surface of the lens and A a correction expressed in dioptrics which takes into account also the thickness in meters "$d$" of the lens, as well understood in the art.

The value of A, or the correction for the lens thickness, may be computed from the formula $$A = \frac{D^1}{1 - \frac{d}{n} D_1} - D_1$$

wherein $D_1$ and $d$ have the above meaning and $n$ represents the index of refraction of the glass which may for practical purposes be considered as a constant. This computation is tedious and offers opportunity for error. It has been found possible, however, by means of this invention to design an instrument which will read directly the sum $D_1 + A$, by, for example, rotating the dial carrying the scale of surface powers by an amount sufficient to add the quantity A corresponding to the values of $D_1$ and $d$ for the lens in question. To this end a scale 36 is engraved on the side of the instrument casing as shown in Figure 4. The numbers of this scale correspond to numbers read from a table so arranged that one and only one number corresponds to a particular combination of $D_1$ and $d$. The table may be associated in some convenient manner with the gauge for convenience in use. Thus, for example, when a form of curvature gauge is employed having but a single dial, such table may be placed upon the blank rear face of the gauge.

The annular frame of the instrument is formed with a slot 37, Figures 2 and 4, adjacent scale 36 and movably carried in the slot is an arm 38 the outer end 39 of which is formed as an index movable over scale 36. Arm 38 within the instrument frame is fixed as by means of rivets 40 to the dial 29 to rotate the latter as the index 39 of the arm is adjusted over scale 36. The numbers of the above table are so spaced on scale 36 that when the index is moved over the scale to a number taken from the above table the dial 29 is rotated through a distance corresponding to the actual value of A. This corrective rotation of the dial adds the value of A to the value $D_1$ indicated by application of the instrument to the lens surface. The reading of the instrument then gives directly the value $D_1 + A$.

It is then merely required in use to measure the thickness $d$ of the lens and the surface powers $D_1$ and $D_2$ with the curvature gauge and to select from the table the proper value which is then indicated on scale 36 by adjustment of index 39. The sum of $D_1$ and A may then be read directly from the curvature gauge when the latter is applied to the corresponding surface of the lens, to which result the value of $D_2$ is added to give the desired vertex refraction D. By this means the vertex refraction of a lens may be obtained conveniently and expeditiously with a minimum of written computations and of opportunities for error.

I claim as my invention:

1. In a measuring instrument the combination with means for measuring the surface curvature of a lens including relatively movable indicating parts and relatively movable lens engaging members, one of which is operatively connected with one of said indicating parts, of an index member operatively connected with the other of said indicating parts for adjusting the same, and a scale positioned independently of said indicating parts and marked with a range of values corresponding to different lens thickness measurements, said index member being movable selectively with reference to said values to afford in conjunction with said indicating parts a combined indication corresponding to a measurement of curvature and one of said values.

2. In a measuring instrument, the combination with means for measuring the surface of a lens including a dial, an index member and lens engaging members, one of which is operatively connected with said index member, of a scale mounted independently of the dial and marked with a range of values corresponding to different lens thickness measurements, and a member operatively connected with the dial and movable selectively with reference to said scale, and adapted during such movement to adjust the dial to produce a combined indication corresponding to a measurement of curvature and one of said values.

3. The combination with a lens curvature gauge having a plurality of relatively movable contacts arranged to conform with the curved surface of a lens, a rotatable dial, and an index actuated by relative movement of said contacts one of which is adapted for cooperation with said dial, of a scale mounted independent of the dial and marked with a range of values corresponding to different lens thickness measurements, a second index member, said scale and second index member being manually movable relatively to each other to select one of said values, and a connection between the second index member and said dial to adjust the latter to indicate the sum of two quantities one corresponding to a curvature measurement and the other to selected ones of said range of values.

WILBUR B. RAYTON.